United States Patent [19]

Haubennestel et al.

[11] Patent Number: 6,111,054
[45] Date of Patent: Aug. 29, 2000

[54] PRODUCTS OBTAINABLE BY SALT FORMATION FROM POLYAMINES AND THE USE THEREOF AS DISPERSING AGENTS FOR PIGMENTS AND EXTENDERS

[75] Inventors: Karlheinz Haubennestel; Ulrich Orth; Wolfgang Pritschins; Udo Krappe, all of Wesel, Germany

[73] Assignee: BYK-Chemie GmbH, Wesel, Germany

[21] Appl. No.: 09/105,975

[22] Filed: Jun. 26, 1998

[30] Foreign Application Priority Data

Jul. 26, 1997 [DE] Germany .......................... 197 32 251

[51] Int. Cl.[7] .......................... C08G 69/00; C08G 63/00; B01F 3/00; C09D 5/02
[52] U.S. Cl. .......................... 528/176; 528/220; 528/229; 528/312; 528/313; 528/322; 528/332; 528/336; 528/337; 524/800; 524/801; 524/802; 524/813; 524/817; 524/818; 252/363.5
[58] Field of Search .................................... 528/312, 313, 528/220, 176, 229, 322, 332, 337, 336; 252/363.5; 524/801, 800, 802, 813, 817, 818

[56] References Cited

U.S. PATENT DOCUMENTS

| 3,298,912 | 1/1967 | Scherr ........................................ 167/42 |
| 3,980,602 | 9/1976 | Jakubauskas ............................ 106/304 |
| 5,143,952 | 9/1992 | Saheki et al. ................................ 524/5 |

FOREIGN PATENT DOCUMENTS

| 0 159 678 | 10/1985 | European Pat. Off. . |
| 0 270 126 | 6/1988 | European Pat. Off. . |
| 0 311 157 | 4/1989 | European Pat. Off. . |
| 0 318 999 | 6/1989 | European Pat. Off. . |
| 0 346 064 | 12/1989 | European Pat. Off. . |
| 0 417 490 | 3/1991 | European Pat. Off. . |
| 0 438 836 | 7/1991 | European Pat. Off. . |
| 0 713 894 | 5/1996 | European Pat. Off. . |
| 657081 | 9/1951 | United Kingdom . |
| 2 153 804 | 8/1985 | United Kingdom . |

*Primary Examiner*—P. Hampton-Hightower
*Attorney, Agent, or Firm*—Schwegman, Lundberg, Woessner & Kluth, P.A.

[57] ABSTRACT

The present invention relates to a dispersing agent for pigments or extenders which is obtainable by salt formation from an amine-functional compound by means of an acid, wherein a polyamine which contains at least three amino groups and which is from the group comprising aliphatic linear polyamines and/or aliphatic branched polyamines and/or modified polyamines, with the proviso that after modification three amino groups which can be converted into salts are still present per molecule, or a mixture of polyamines such as these, is used as the amine-functional compound, and
wherein a substance from the group comprising phosphoric acid esters of general formula: $(HO)_{3-n}PO(OR^1)_n$ where n=1 or 2, sulphonic acids of general formula $HOSO_2R^2$ and acidic sulphuric acid esters of general formula $HOSO_3R^2$ is used as the acid, wherein $R^1$ and $R^2$ represent an alkyl, aryl or aralkyl radical containing at least 5 C atoms and/or a radical of an oxyalkylated alcohol with a number average molecular weight between 100 and 5000 g/mole and/or a radical containing at least one carboxylic acid ester group and/or a urethane group with a number average molecular weight between 100 and 5000 g/mole, or a mixture of substances such as these, wherein $R^1$ and $R^2$ can be the same or different.

The invention also relates to the use of the dispersing agent and to a method of producing it.

29 Claims, No Drawings

PRODUCTS OBTAINABLE BY SALT FORMATION FROM POLYAMINES AND THE USE THEREOF AS DISPERSING AGENTS FOR PIGMENTS AND EXTENDERS

This invention relates to the use of compounds, which are obtainable by the reaction of organic acids with polyamines, as dispersing agents for organic and inorganic pigments and for extenders and fillers in organic and aqueous systems. These dispersing agents are suitable for the stabilisation of solid particles in binder vehicles, lacquers, pigment pastes, plastics and plastics mixtures, for the reduction of the viscosity of such systems, and for the improvement of flow properties.

BACKGROUND OF THE INVENTION

High mechanical forces are necessary in order to be able to incorporate solids in liquid media. It is customary to employ dispersing agents in order to reduce these dispersion forces and in order to keep the total energy input into the system, which is necessary for deflocculating the solid particles and thus the time of dispersion also, as low as possible. These dispersing agents are surface-active substances of anionic, cationic or neutral structure. These substances are added in a small amount either directly to the solid or to the dispersion medium. Furthermore, it is known that even after complete deflocculation of the solid agglomerates into primary particles, re-agglomeration occurs after the dispersion process. Thus, the effort expended to produce a dispersion is partially or completely negated. The consequences of an unstable dispersion or of re-agglomeration are unwanted effects such as an increase of the viscosity in liquid systems, drift of colour tone and losses of gloss in lacquers and coatings, as well as a reduction of the mechanical strength of plastics.

There is a multiplicity of different substances which are used nowadays as dispersing agents for pigments and extenders. A review of the existing patent literature is given in EP 0 318 999 (page 2, lines 24–26). Apart from very simple, low molecular weight compounds such as lecithin, fatty acids and salts thereof, and alkylphenol ethoxylates for example, complex structures are also used as dispersing agents. In particular, these comprise amino- and amide-functional systems, which are widely used amongst dispersing agents. In GB 2 153 804 for example, amino- and amide-functional poly- and oligocopolymers based on polyamines and polycaprolactones are used for the dispersion of magnetic pigments. EP 0 713 894 describes the use of amino-functional polylactones for coatings and printing inks. Moreover, amine-functional polyacrylates (EP 0 311 157, U.S. Pat. No. 3,980,602) are used for the stabilisation of organic and inorganic pigments. Amine-functional polymers based on polyisocyanates constitute a further group (EP 0 159 678, EP 0 438 836).

Derivatives of phosphoric acid esters are also frequently used as dispersing agents. EP 0 417 490 (page 2, lines 23–43) gives a summary of the use of these substances, preferably as dispersing agents or for the pretreatment of pigments. The salts of acidic phosphoric acid esters are also described in this patent. Inorganic bases as well as mono- and diamines are listed as the basic salt formation components.

Whilst satisfactory stabilisation of pigments or solids can be achieved, many of these dispersing agents have an insufficient capacity for reducing the viscosity on the incorporation of pigments or of solid particles in binder vehicles and pigment concentrates. In the course of continuing efforts aimed at producing environmentally compatible systems, the necessity exists of reducing the amount of solvent as far as possible (e.g. high-solids and ultra-high solids lacquers), or of dispensing with solvent completely. In general, this leads to problems in production, since the viscosity is often too high on the incorporation or dispersion of solid particles. This is particularly relevant to the production of pigment concentrates, for which a degree of pigmentation which is as high as possible should be reached whilst at the same time keeping the proportion of binder vehicle or solvent low.

Pigment pastes only develop their fill capacity for use if they can be used as universally as possible, i.e. in many different binder vehicles which often differ considerably as regards their polarity. It is exactly this broad compatibility of pigment pastes which cannot be ensured by the dispersing agents used hitherto, so that the use of paste systems is significantly restricted. Apart from the use of pigment pastes in different binder vehicles, the miscibility of pastes with each other and in the binder vehicle without flocculation has to be ensured.

The aforementioned dispersing agents often only constitute partial solutions of this problem. On account of the multiplicity of inorganic and organic pigments and extenders which are used nowadays, satisfactory stabilisation of the solid particles to be dispersed is not ensured to an adequate extent by covering the surface in a manner which is stable as regards desorption. Agglomerates are thus formed, since the requisite, efficient steric hindrance is lacking.

The underlying object of the present invention is therefore to eliminate the aforementioned disadvantages of known dispersing agents, i.e. to develop dispersion additives which whilst ensuring good stabilisation of pigments or extenders reduce the viscosity of the milled material of lacquers, pastes or plastics formulations to such an extent that they can be processed at a high filling ratios. At the same time, particularly for pigment and extender pastes, a broad range of compatibility must be ensured so as to be able to use these in many different binder vehicles and coating materials. Moreover, it is necessary that the dispersion additives which are used according to the invention result in miscibility with each other of pastes, or of binder vehicles produced using these pastes, without flocculation.

SUMMARY OF THE INVENTION

Surprisingly, it has been shown that a considerable improvement in the dispersion and stabilisation of pigments or extender particles in binder vehicles, pigment pastes or plastics formulations can be achieved if additives are used which are produced by salt formation from polyamines with acids comprising organic radicals. Moreover, these dispersing agents surprisingly exhibit a broad range of compatibility and can be used both in polar and in non-polar binder vehicle systems. They considerably reduce the viscosity of ground material during dispersion and therefore enable formulations having a high solids content to be produced.

Dispersing agents such as these for pigments and extenders have been obtained by salt formation from an amine-functional compound by means of an acid, wherein a polyamine which contains at least three amino groups and which is from the group comprising aliphatic linear polyamines and/or aliphatic branched polyamines and/or modified polyamines, with the proviso that after modification three amino groups which can be converted into salts are still present per molecule, or a mixture of polyamines such as these, is used as the amine-functional compound, and wherein a substance from the group comprising phosphoric acid esters of general formula: $(HO)_{3-n}PO(OR^1)_n$ where n=1 or 2, sulphonic acids of general formula $HOSO_2R^2$ and acidic sulphuric acid esters of general formula $HOSO_3R^2$ is used as the acid, wherein $R^1$ and $R^2$ represent an alkyl aryl or aralkyl radical containing at least 5 C atoms and/or a radical of an oxyalkylated alcohol with a number average molecular weight between 100 and 5000 g/mole and/or a radical containing at least one carboxylic acid ester group and/or a urethane group with a number average molecular weight between 100 and 5000 g/mole, or a mixture of substances such as these, wherein $R^1$ and $R^2$ can be the same or different.

DETAILED DESCRIPTION OF THE INVENTION

The present invention thus relates to compounds which are obtained by salt formation from a) phosphoric acid esters of general formula

$$(OH)_{3-n}PO(OR^1)_n, \qquad (1)$$

where n=1, 2 and/or b) sulphonic acids (2) and acidic sulphuric acid esters (3) of general formula:

$$HOSO_2R^2 \qquad (2)$$

$$HOSO_3R^2 \qquad (3)$$

with c) modified and/or unmodified polyamines, preferably with a molecular weight of up to 1,000,000 g/mole.

In this connection, polyamines are to be understood as substances which contain at least three amino groups per molecule.

The $R^{1,2}$ radical in a) and b), which may be the same or different, is an essential constituent of the dispersing agents according to the invention, and is characterised in that it contains at least one ether oxygen (—O—) and/or one carboxylic acid ester function (—COO—) and/or one urethane group (—NHCOO—), and/or comprises an alkyl aryl or aralkyl radical with more than 5 carbon atoms. The number average molecular weight $M_n$ of the $R^{1,2}$ radicals may be between 100 and 20,000 g/mole, wherein hydrogen atoms, particularly those of the aliphatic groups of the $R^{1,2}$ radicals, can be partially replaced by halogen atoms. In addition, the $R^{1,2}$ radicals may contain groups which exhibit inert behaviour during the formation of the salt formation product, such as a carboxylic acid amide group (—NHCO—), non-activated double bonds or urea groupings (—NHCONH—) for example. $R^{1,2}$ preferably constitutes a radical of an oxyalkylated monoalcohol, most preferably the radical of a $(C_2-C_4)$oxyalkylated monoalcohol and/or of a monoalcohol which contains carboxylic acid esters and/or urethane groups. The molecular weight of an $R^{1,2}$ radical such as this preferably falls within the range from 100–5000 g/mole, since products with a lower or higher molecular weight have proved to be less effective. Moreover, radicals with a higher molecular weight can only be produced with difficulty, and are for the most part unobtainable commercially. The molecular weights of the $R^{1,2}$ radicals most preferably fall within the range between 300 and 2500 g/mole, since products with radicals which fall within this molecular weight range can be produced without difficulty and exhibit excellent efficacy. The phosphoric acid esters which are most particularly preferred are those in which the $R^1$ radical constitutes an oxyalkylated monoalcohol or a monoalcohol which contains carboxylic acid esters, or a monoalcohol which contains oxyalkylated carboxylic acid esters, with an average molecular weight within the range from 300–2500 g/mole.

By the choice of the $R^{1,2}$ radicals, a matched compatibility of the dispersion additives with very different binder vehicles is ensured. For $R^{1,2}$ radicals which comprise a mixture of oxyalkylated radicals and radicals which contain carboxylic acid esters, the ratio of ether oxygens to carboxylic acid ester groups is between 1:20 and 20:1. This ratio is preferably within the range between 1:10 and 10:1, and is most preferably between 1:5 and 5:1, since $R^{1,2}$ radicals which are synthesised in this manner ensure a particularly broad range of compatibility of the products according to the invention. The molecular weight of an $R^{1,2}$ radical preferably falls within the range from 200 to 5000 g/mole; most preferably within the range between 300 and 2500 g/mole. The aforementioned reasons for the choice of molecular weight ranges also apply to $R^{1,2}$ radicals containing oxyalkylated carboxylic acid esters.

Examples of substances which can be used as sulphur-containing salt formation components include linear and non-linear alkylarylsulphonic acids, such as dodecylbenzenesulphonic acid, dodecylnaphthylsulphonic acid and the alkyl sulphates which can readily be obtained by the esterification of monohydroxy compounds with concentrated sulphuric acid.

Alkyl, aryl or aralkyl monoalcohols which contain more than 5 carbon atoms in their chain can be used as a monohydroxy compound (HO—$R^{1,2}$) for the formation of the phosphoric acid esters and sulphuric acid esters. Examples thereof therefore include cyclohexanol, fatty alcohols, alkyl phenols, alkylnaphthols and phenylethanol, as well as monohydroxy-functional polybutadienes, polypropylenes or polystyrenes. Substances which can be used as monohydroxy compounds are preferably those which contain at least one ether oxygen atom (—O—) and/or one carboxylic acid ester group (—COO—) and/or one urethane group (—NHCOO—). These therefore include polyethers, such as ethylene oxide and/or propylene oxide (co)polymers and/or mixed polyether-polyesters, for example, such as those which are obtainable by the polymerisation of a lactone (e.g. propiolactone, valerolactone, caprolactone) with a monohydroxypolyether, or by condensation of hydroxy-carboxylic acids in the presence of monohydroxypolyethers for example. The mixed polyethers and mixed polyether-polyesters can be disposed in a block structure (e.g. poly(ethylene oxide block-propylene-oxide-block-ε-caprolactone) or may also be disposed randomly.

Of the monohydroxy compounds listed above, alcohols which contain polyesters are preferably used for the formation of phosphoric acid esters. Monohydroxy compounds which contain mixed ethoxylated and/or propoxylated polyesters, and also ethoxylated and/or propoxylated monohydroxy compounds, are most preferably used.

In addition to monohydroxy compounds (HO—$R^{1,2}$), certain proportions of dihydroxy compounds (HO—$R^{1,2}$—OH) can also be used for the formation of phosphoric acid and sulphuric acid esters. Certain proportions of disulphonic acids can also be used. Due to the co-flocculating effect of dimeric phosphoric acid and sulphuric acid esters such as these, as well as that of disulphonic acids, the stability on storage (anti-settling behaviour) of formulations produced with these compounds can be increased in particular.

All the compounds which are used as acidic salt formation components may also contain, in their organic radicals, other groups which exhibit inert behaviour during the subsequent salt formation.

The synthesis of the phosphoric acid esters according to the invention, which are used for salt formation from polyamines, is described, for example, in Houben-Weyl "Methoden der organischen Chemie" Volume XII/2, 4th Edition, pages 143 et seq. Depending on the type of phosphorylation reagent used (e.g. $P_2O_5$, $PCl_5$, polyphosphoric acid (PPS)) and on the stoichiometric amount of phosphorylation reagent which is used to the component which is to be phosphorylated ($R^1OH$, mono- or diesters or even mixtures of both species are formed. It is also possible to use a mixture of components to be phosphorylated which are different during the phosphorylation reaction.

As is known to one skilled in the art, polyphosphoric acid esters can also be formed in varying proportions in addition to phosphoric acid esters when higher, condensed polyphosphoric acids are used. However, under the effect of water, which often surrounds pigments and solids as a hydration shell, these polyphosphoric acid esters decompose with the formation of the phosphoric acid esters according to the invention.

The acidic sulphuric acid esters and the sulphonic acids are prepared by methods which are generally known.

Values between 0.02 and 1, more preferably values between 0.1 and 1, and most preferably values between 0.5 and 1 are set as the degree of salt formation (in this context, this term is to be understood as the ratio of acid equivalents to amine equivalents), since the last-mentioned products possess the widest range of usability for different binder vehicles and solids. The degree of salt formation must be selected so that at least one amino group per molecule is converted into a salt.

Depending on the solid to be dispersed which is used, products with a high or low degree of salt formation can be used. Thus, for example, for the dispersion of acidic types of carbon black, salt formation components which possess excellent dispersion properties include those which comprise a considerable excess of basic groups, and in which the polyamine is therefore not completely converted into a salt by the corresponding acid. Apart from products which have not been fully converted into salts, it is useful for certain applications at least if products are also used which comprise an excess of acid with respect to the amine equivalent, e.g. when the solids to be dispersed are themselves basic. Examples of polyamnine components used in the salt formation reactions include: aliphatic amines containing at least three primary and/or secondary and/or tertiary amino groups. Aliphatic linear polyamines comprising primary and secondary amino groups are preferably used, such as diethylenetriamine (DETA), triethylenetetramine (TETA), tetraethylene-pentanine (TEPA), pentaethylenehexamine, hexaethylene heptamine and higher homologues. Aliphatic branched polyamines are preferably used, particularly ($C_2$–$C_4$)-alkylene amines, which comprise primary, secondary and tertiary amino groups and which have molecular weights of 800–1,000,000 g/mole, such as the Lupasol® types produced by BASF, or the Epomin® types produced by Nippon Shokubai. These branched aliphatic polyamines, which are also known by the name of polyimines or aziridine homopolymers, are produced by known methods, e.g. by the polymerisation of ethylene imine. Of these aliphatic branched polyamines, types with an average MW of about 600–200,000 g/mole are preferably used, and types with an average MW of about 1000–40,000 g/mole are preferably used, since the salt formation products thereof have proved to be particularly effective. The protons on the nitrogen of these compounds may preferably be replaced by alkyl, aryl and/or aralkyl groups and/or may be present in quaternized form. The aziridine homopolymers described above are also obtainable as alkoxylated variants, in which the protons on the primary or secondary nitrogen atoms are completely or partially replaced by ethylene oxide and/or propylene oxide units, for example.

Dendrimers containing basic groups, for example the Astramol® type produced by DSM, are also suitable for functioning as polyamine components.

Apart from unmodified polyamines, partially modified polyamines can also be used for salt formation. These substituted polyamines may be condensates of the polyamines described above with carboxylic acids, such as stearic acid, oleic acid or tall oil fatty acid for example, which are bonded to the polyamine via amide groups. Moreover, it is also possible to react parts of the primary or secondary polyamines with monoisocyanates, such as stearyl isocyanate and/or polyisocyanates comprising n NCO groups, (n–1) NCO groups of which have previously reacted with other reactants. In addition, it is possible to form salts from polyamines which have previously reacted with epoxy-functional substances and/or with cyclic carbonates. It is also possible to use polyamines which have previously undergone a plurality of the reactions described above, or which are partially quaternized with alkylating agents.

Addition products, which are formed by the reaction of vinyl compounds with primary and secondary amino groups of polyamines in the sense of a Michael reaction and from which salts are then formed, constitute a particularly preferred embodiment of substituted polyamines. The advantage of the Michael reaction is that the number of amino groups of the polyamines does not change during the reaction. Moreover, all the amino groups are also available for subsequent salt formation. The high ionic density of compounds which are produced in this manner and are then converted into salts has proved to be particularly advantageous for the dispersion capacity thereof. Examples of vinyl-like compounds which can be used in the Michael reaction include $\alpha,\beta$-unsaturated carbonyl compounds such as $\alpha,\beta$-unsaturated carboxylic acid esters or $\alpha,\beta$-unsaturated nitrites. The preferred embodiments of these Michael addition products are the reaction products which are formed from polyamines and acrylic acid- and/or methacrylic acid esters and aliphatic, aromatic and/or aralkylic radicals such as methyl (meth)acrylate, butyl (meth)acrylate, ethylhexyl (meth)acrylate, lauryl (meth)acrylate, stearyl (meth)acrylate or benzyl (meth)acrylate; ethoxylated and/or propoxylated (meth)acrylates as well as hydroxy-functional (meth) acrylates such as hydroxyethyl (meth)acrylate and hydroxypropyl (meth)acrylate. The respective acrylic acid derivatives are preferably reacted. Other suitable $\alpha,\beta$-unsaturated compounds include maleic acid- and itaconic acid esters such as diethyl maleate or dibutyl maleate, as well as $\alpha,\beta$-unsaturated phosphonic acids such as vinylphosphonic acid. If Michael addition products are formed, 5–100% of the primary and secondary amino groups can be subjected to this reaction. 15–85% of the primary and secondary amino groups are preferably reacted, and 25–75% of the primary and secondary amino groups are most preferably reacted. In general, a polyamine is preferably used in which 0.5 to 90 mole % (with respect to the primary and secondary amino groups), most preferably 1 to 50 mole % of the primary and/or secondary amino groups, is reacted, before or after salt formation, with carboxylic acids with the formation of an amide, with isocyanates with the formation of urea and/or with epoxides with the formation of α-amino-β-hydroxy compounds and/or with α,β-unsaturated compounds in the sense of a Michael addition, or a mixture of amines such as these is used.

A condition which applies to all the substituted polyamines is that at least three amino groups which are capable of salt formation must still be present after modification.

A further class of polyamines which is suitable for salt formation with the acids described above is that comprising homo-, co- or block copolymers containing at least three amino groups, which can be produced either by radical or ionic polymerisation methods or by means of a reaction analogous to polymerisation on a polymer which has already been formed previously. Examples which should be cited here include polymers which comprise, as their basic groups, monomers which are incorporated by polymerisation such as dimethylaminoethyl (meth)acrylate, N-tert-butyl aminoethyl (meth)acrylate, vinylpyridine, vinylpiperidine or vinylimidazole, for example. Mono-, co- or block copolymers of this type have a number average molecular weight up to 1,000,000 g/mole, preferably 600–200,000 g/mole. Said polyamines can be used individually or in admixre.

By the use in particular of polyamines as a salt formation component, it has proved possible to produce dispersing agents which are of very broad compatibility and which as regards their possibilities of use are thus clearly superior to structures which result from salt formation from mono- or diamines.

The dispersing agents according to the invention can be used as is known in the prior art for known dispersing agents. Thus they can be used, for example, for the production of lacquers, pastes and/or moulding compositions which contain pigments and/or extenders. For example, the dispersing agents can be used for the production of a pigmented lacquer, wherein a lacquer binder vehicle and/or solvents, pigments and optionally extenders are mixed with the dispersing agent and customary adjuvant substances. Finally, the present invention also relates to the use of a dispersing agent of this type for the production of pigmented coatings on a substrate, wherein the pigmented lacquer is applied to the substrate and wherein the pigmented lacquer which is applied to the substrate is stoved, hardened or crosslinked. The dispersing agents can be used on their own or together with binder vehicles which are not functionally bonded. When they are used in polyolefines, it may be advantageous to use corresponding low molecular weight polyolefines as carrier materials together with the dispersing agent. One use according to the invention of the dispersing agents consists of the production of dispersible solids in the form of powder particles and/or fibrous particles, wherein the particles are coated with the dispersing agent. Coatings of this type on organic and on inorganic solids are produced in a manner which is known, such as by the methods which are described in EP-A-0 270 126 for example. In the course of this procedure, the solvent or emulsion medium can either be removed or can remain in the mixture with the formation of pastes. These pastes are customary commercial products and may contain proportions of binder vehicles in addition, as well as other adjuvant substances and additives. For pigments in particular, coating of the pigment surface can be effected during or after the synthesis of the pigments, e.g. by the addition of the products formed by salt formation according to the invention to the pigment suspension, or during or after the finishing operation on the pigment.

Pigments which are pretreated in this manner are distinguished by their greater ease of incorporation in the binder vehicle and by their improved behaviour as regards viscosity, flocculation and gloss compared with untreated pigments.

In addition to the application described above as coating media for solids in powder form and in fibrous form, the dispersing agents according to the invention can also be used as viscosity-reducing agents and as compatibility enhancers in synthetic resins. Examples of synthetic resins such as these include what are termed "sheet moulding compounds" (SMCs) and "bulk moulding compounds" (BMCs), which consist of unsaturated polyester resins which have a high content of fillers and fibres. The production and processing thereof is described in DE-A-36 43007, for example. In order to obtain high rigidity, good surface quality and flame-retardant properties when using fillers such as $Al(OH)_3$ or $Mg(OH)_2$ for example, it is necessary to fill these systems to a considerable extent with fillers and fibres, which results in a sharp increase in the viscosity of SMC and BMC mixtures and which results in problems with the wetting of the fibres. A further problem of SMC and BMC synthetic resin mixtures is that polystyrene (PS) is often added to the formulation in order to reduce shrinkage during the processing procedure. PS is not compatible with the unsaturated polyester resins used, and separation of the components occurs. By the use of the salts according to the invention, it is possible considerably to reduce the viscosity of the resin/filler mixture, so that a higher degree of filling is possible, which has a positive effect on the mechanical properties and on the nature of the surface, and which has a positive effect on the flame-retardant properties when $Al(OH)_3$ or $Mg(OH)_2$ is used. When PS-filled SMC- or BMC mixtures are used, the additives according to the invention can give rise, on account of their good dispersion qualities, to compatibility between the PS and the unsaturated polyester resin, due to which the stability on storage and the reliability of processing of mixtures such as these are increased.

In general, the dispersing agents according to the invention are used in an amount of 0.5 to 100% by weight with respect to the solid to be dispersed. Considerably larger amounts of the dispersing agents may be necessary for the dispersion of special solids, however.

The amount of dispersing agent substantially depends on the surface area of the solid to be dispersed which is to be covered. For example, carbon black requires a considerably larger amount of dispersing agent than does $TiO_2$. Examples of pigments or extenders are given in EP-A-0 270 126. Other examples include recent developments, particularly in the field of organic pigments, such as the class comprising diketo-pyrrolo-pyrroles for example, and also include magnetic pigments, e.g. those based on pure iron or on mixed oxides.

In addition, mineral fillers or extenders, e.g. calcium carbonate or calcium oxide, and also flame-retardants, such as aluminium or magnesium hydroxides for example, can also be dispersed. Matting agents such as hydrated silicas can likewise be excellently dispersed and stabilised.

The present invention further relates to a method of producing a dispersing agent,
wherein an amine-functional compound is used which contain at least three amino groups and which is from the group comprising aliphatic linear polyamines and/or aliphatic branched polyamines and/or modified polyamines, with the proviso that after modification three amino groups which can be converted into salts are still present per molecule, or a mixture of polyamines such as these is used, and a substance is used as an acid from the group comprising phosphoric acid esters of general formula: $(HO)_{3-n}PO(OR^1)_n$ where n=1 or 2, sulphonic acids of general formula $HOSO_2R^2$ and acidic sulphuric acid esters of general formula $HOSO_3R^2$, wherein $R^1$ and $R^2$ represent an alkyl, aryl or aralkyl radical containing at least 5 C atoms and/or a radical of an oxyalkylated alcohol with a number average molecular weight between 100 and 5000 g/mole and/or a radical containing at least one carboxylic acid ester group and/or a urethane group with a number average molecular weight between 100 and 5000 g/mole, or a mixture of substances such as these, wherein $R^1$ and $R^2$ can be the same or different, and the amino-functional compounds and the acids belong to the classes of compounds cited in the above description.

1. PRODUCTION EXAMPLES

The invention is additionally explained by the following examples. For substances which are molecularly non-uniform, the quoted molecular weights constitute number average values. Unless state otherwise, parts are given as parts by weight and percentages are given as percentages by weight.

The following abbreviations are used in the production examples:

| TETA | triethylenetetramine |
| PMA | propylene glycol monomethyl ether acetate |
| DDBSS | dodecylbenzenesulphonic acid |
| BG | butyl glycol |
| PM | propylene glycol monomethyl ether |

Production of Salt Formation Products (According to the Invention)

Example 1

10 parts triethylenetetramine (TETA) were dissolved, to give a clear solution, in a mixture of 30 parts i-butanol and 10 parts propylene glycol monomethyl ether acetate (PMA). The reaction mixture was heated to 50° C. and was slowly mixed with 49.5 parts dodecylbenzenesulphonic acid (DDBSS) (Reworyl K; a product of Rewo Chem. Group). A clear yellowish-brown reaction solution was obtained.

Example 2

10 parts TETA in 10 parts butyl glycol (BG) were reacted, analogously to Example 1, with a mixture of 40 parts DDBSS and 20 parts of a monocarboxylic acid-fumctional octanol ethoxylate (Akypo OP 80; a product of Chemy) in a solvent mixture comprising 20 parts i-butanol and 40 parts PMA. A clear yellowish-brown reaction solution was obtained.

Examples 3 and 4

Other amines were reacted with sulphonic acids, analogously to Example 1. These tests are summarised in Table 1:

TABLE 1

| Example No. | Amount of amine used | Amount of acid used | Amount of solvent or solvent mixture |
| --- | --- | --- | --- |
| Example 3 | 18 parts polyamine[1] | 51 parts DDBSS | 25 parts BG + 44 parts PMA |
| Example 4 | 18 parts polyamine[1] | 51 parts DDBSS + 25 parts tall oil fatty acid | 31 parts BG + 63 parts PMA |

[1]The polyamine used in Examples 3 and 4 was the branched aliphatic aziridine homopolymer: Epomin ® SP012, a commercial product of Nippon Shokubai Co. Ltd.

Example 5

12.5 parts TETA were dissolved in 50 parts BG and 20 parts xylene. A mixture comprising 105.5 parts of a phosphoric acid monoester containing a nonylphenol ethoxylate as the $R^1$ radical (total molecular weight~800 g/mole and containing small proportions of the corresponding phosphoric acid diester) (phosphoric acid ester A) in 48 parts PMA was added drop-wise over 30 minutes to the reaction mixture, which was heated to 80° C. The reaction mixture was subsequently stirred for 15 minutes at 80° C. A clear yellowish-brown reaction solution was obtained.

Examples 6–16

Other amines were converted into salts with different phosphoric acid esters, analogously to Example 8. These tests are summarised in Table 2:

TABLE 2

| Example No. | Amount of amine used | Amount of phosphoric acid ester used | Amount of solvent or solvent mixture used |
| --- | --- | --- | --- |
| Example 6 | 12 parts TETA | 122 parts phosphoric acid esters A | 30 parts i-butanol + 25 parts PMA |
| Example 7 | 10 parts polyamine[1] | 80 parts phosphoric acid ester A | 50 parts i-butanol + 40 parts butyl acetate |
| Example 8 | 10.5 parts polyamine[1] | 42 parts phosphoric acid ester A | 27.5 parts i-butanol + 25 parts butyl acetate |
| Example 9 | 5 parts TETA | 55 parts phosphoric acid ester B | 10 parts i-butanol + 50 parts xylene |
| Example 10 | 8 parts polyamine[1] | 68 parts phosphoric acid ester B | 20 parts i-butanol + 56 parts xylene |
| Example 11 | 10 parts polyamine[2] | 68 parts phosphoric acid ester 2 | 78 parts BG |
| Example 12 | 7 parts polyamine[1] | 67 parts phosphoric acid ester C | 33 parts PMA + 33 parts xylene 33 parts i-butanol |
| Example 13 | 10 parts TETA | 67 parts phosphoric acid ester D | 44 parts PMA + 33 parts i-butanol |
| Example 14 | 18 parts polyamine[3] | 85 parts phosphoric acid ester D | 25 parts PMA + 78 parts BG |
| Example 15 | 18 parts polyamine[2] | 173 parts phosphoric acid ester B | 192 parts BG |

[1]The polyamine used in Examples 7, 8, 10 and 12 was a branched aliphatic aziridine homopolymer: Epomin ® SP012, a commercial product of Nippon Shokubai Co. Ltd.
[2]The polyamine used in Examples 11, 13, 15 and 16 was a branched aliphatic aziridine homopolymer: Epomin ® SP200, a commercial product of Nippon Shokubai Co. Ltd.
[3]The polyamine used in Example 14 was a branched aliphatic aziridine homopolymer: Lupasol ® WF, a commercial product of BASF.

Phosphoric acid ester A: the phosphoric acid ester from Example 5

Phosphoric acid ester B: a phosphoric acid monoester (comprising small proportions of phosphoric acid diester) corresponding to general formula (1) where $R^1$=butoxypoly(ethylene glycol-co-propylene glycol) ($M_n$: 1000 g/mole)

Phosphoric acid ester C: a phosphoric acid monoester (comprising small proportions of phosphoric acid diester) corresponding to general formula (1) where $R^1$=a caprolactone polyester started on methoxypolyethylene glycol ($M_n$: 350 g/mole) with a total molecular weight of 900 g/mole Phosphoric acid ester D: a phosphoric acid monoester (comprising small proportions of phosphoric acid diester) corresponding to general formula (1) where $R^1$=butoxypolypropylene glycol ($M_n$: 750 g/mole)

Preliminary Product 16

A mixture of 35.5 parts of the polyethyleneamine used in Example 11 with 55 parts tall oil fatty acid in 100 parts xylene was reacted under conditions of subsequent water removal until the evolution of water ceased (about 2 hours). The amine number (AN) of the brown, low-viscosity product obtained in this manner was 132.

Example 16

36.4 parts phosphoric ester B was added drop-wise, over 30 minutes, to a mixture of 40.8 parts of preliminary product 16 with 40.8 parts butyl glycol, which was heated to 60° C. The batch was stirred for 30 minutes at 80° C. after the addition. A clear, brown, low-viscosity reaction mixture was obtained.

Preliminary product 17

15.8 parts tall oil fatty acid were dissolved, together with 30 parts of the polyimine used in Example 19, in 45.8 parts xylene. The batch was then stirred for 1 hour at 100° C., whereupon the reaction mixture became slightly turbid. The reaction mixture was then subjected to azeotropic distillation in a water separator until the evolution of water was complete. 22.8 parts xylene were then removed from the reaction mixture. A clear, yellowish-brown solution was obtained.

Examples 18 and 19

Preliminary product 17 was subjected to a salt formation reaction with various phosphoric acid esters, analogously to Example 16. These tests are summarised in Table 3.

TABLE 3

| Example No. | Amount of amine used | Amount of phosphoric acid ester used | Amount of solvent or solvent mixture |
|---|---|---|---|
| Example 18 | 15 parts preliminary product 17 | 39 parts phosphoric acid ester C | 14 parts PMA + 10 parts BG + 65 parts xylene |
| Example 19 | 5 parts preliminary product 17 | 39 parts phosphoric acid ester D | 14 parts PMA + 33 parts BG |

Example 20

8.5 parts of the polyethyleneamine from Example 14 were dissolved in 42.5 parts BG and heated to 50° C. A mixture of 21.2 parts of the phosphoric acid ester from Example 6 and 20.6 parts DDBSS in 7.2 parts PMA were added drop-wise to this solution over 45 minutes. A clear brown reaction mixture was obtained.

Example 21

8 parts of the polyethyleneamine from Example 14 were dissolved in 6.5 parts BG, 33.4 parts xylene and 12.3 parts PMA and heated to 45° C. 4.3 parts stearyl isocyanate (which had been heated to 60° C. shortly before the reaction in order to liquefy it) was added drop-wise to this solution. The reaction mixture was held at 45° C. for 1 hour. Thereafter, isocyanate groups could no longer be detected. The mixture was then heated to 80° C. and was treated with 35.2 parts phosphoric acid ester D over 15 minutes. A clear, yellowish-brown reaction mixture was obtained, which tended to crystallise out in the cold.

Example 22

10 parts of the polyimine from Example 14 were dissolved in 30 parts BG. 47.7 parts dodecyl hydrogen sulphate in 27.7 parts BG were added drop-wise to the reaction solution at 50° C. After the addition was complete, the reaction solution was stirred for a further 1 hour at 50° C. A clear brown reaction solution was obtained.

Example 23

10 parts of the polyamine from Example 14 were dissolved in 50 parts BG. 2.2 parts ethyl chloroacetate were added to this solution. The reaction solution was then heated to 120° C. under an inert gas atmosphere and was stirred for 1 hour at this temperature. A viscous, yellowish solution was formed, in which ethyl chloroacetate could not longer be detected by means of high-pressure liquid chromatography. 35.2 parts xylene and 73 parts phosphoric acid ester A were slowly added, with intensive stirring, to the reaction solution, which had been cooled to 50° C. A clear to slightly turbid yellowish-brown reaction solution was obtained.

Example 24

12 parts of the polyimine from Example 14 were dissolved in 12 parts PMA and 1.5 parts i-butanol at 50° C. 72 parts of a $C_{10-16}$ alkyl glycidyl ether (HAGE-13 R; a product of Chemischer Fabrik Zaltbommel) were added drop-wise to this solution under a protective gas atmosphere. The reaction solution was subsequently stirred for 1 hour at 60° C., and was then heated to 100° C. and was stirred for a further 2 hours at this temperature. After this time, the content of epoxy groups as determined by means of $^1$H NMR was less than 1%. A clear, slightly yellowish solution was formed, which solidified in the cold to form a milky liquid of honey-like consistency. 10 parts of this reaction solution were diluted at 50° C. with 8.3 parts BG and were subsequently slowly mixed, with stirring, with 9 parts phosphoric acid ester A in 9 parts xylene. A clear yellowish-brown reaction mixture was obtained.

Example 25

In Example 21 a copolymer comprising amine groups, which had been produced by radical polymerisation, was used as the polyamine component. This copolymer contained 30 parts butyl methacrylate, 20 parts methyl methacrylate, 10 parts benzyl methacrylate and 40 parts dimethylaminoethyl methacrylate, and was synthesised by a standard literature method using azobisisobutyronitrile as the initiator. The average molecular weight of the copolymer was 10,000 g/mole. 55 parts of a 66% solution of this polymer in PMA were treated with 14 parts phosphoric acid ester A in 34 parts BG at 60° C. A clear viscous yellowish reaction product was obtained.

Example 26

40.1 parts of Lupasol 158 (Lupasol® 158 is a branched aliphatic ethoxylated aziridin polymer of BASF) were dissolved in 170.4 parts of PM at 80° C. 214.8 parts of the phosphoric acid ester C from Example 12 were slowly added, with stirring, to the reaction solution. A clear yellow reaction solution was obtained.

Example 27

20.2 parts of Lupasol 143 (Lupasol® 143 is a branched aliphatic ethoxylated aziridin polymer of BASF) were dissolved in 170.2 parts of PMA at 80° C. After cooling down the reaction mixture to 40° C. 20 parts of phenylisocyanat were added drop-wise while keeping the reaction temperature below 45° C. After the addition was complete, the reaction solution was stirred for a further 1 hour at 80° C. After this time the isocyanate content of the reaction mixture was less than 0.5%. To this reaction mixture 110 parts of the phosphoric acid ester A from Example 5 were slowly added. A clear yellow reaction solution was obtained.

Preliminary Product 28

The production of a Michael addition product is described in Example 28. 25 parts of the polyamine Lupasol® PR 8515 (a branched aliphatic aziridine homopolymer; a product of BASF, MW: about 2000 g/mole) were dissolved in 15 parts butyl acetate and 10 parts propylene glycol monomethyl ether (PM). 44.8 parts n-butyl acrylate, in which 0.035 parts 3.5-di-tert.-butyl-4-hydroxytoluene were dissolved, were added over 2 hours at room temperature. In the course of this procedure, the temperature of the exothermic reaction which occurred was kept below 40° C. The reaction was followed by means of $^1$H NMR spectroscopy, by monitoring the disappearance of the vinyl proton signal group. After the addition reaction was complete, the primary/secondary/tertiary nitrogen amine distribution corresponded to the values to be expected theoretically.

Example 28

25 parts of basic preliminary product 28 were dissolved in 25 parts PM at 40° C. 25 parts phosphoric acid ester B were added drop-wise to this mixture. After the addition was complete, the batch was stirred for 1 hour at 60° C. A clear yellowish-brown reaction solution was obtained.

Comparative Examples 29–34 (Not According to the Invention)

Comparative examples 29–34 listed below constitute salts, which are not according to the invention, of the stated phosphoric acid esters or sulphonic acids with mono- or diamines. These constitute customary dispersing agents and therefore constitute the nearest prior art in this field (EP 0 417 490). With the aid of these comparative examples, the superior efficacy of the dispersing agents according to the invention is clearly shown in the following application technology part.

Comparative Example 29

12.3 parts 3-dimethylaminopropanol-1 were dissolved in 16.7 parts PMA and 33.3 parts BG analogously to Example 5. 37.7 parts DDBSS were added drop-wise to the reaction mixture, which was heated to 80° C. The reaction mixture was subsequently stirred for 15 minutes at 80° C. A clear yellowish-brown reaction solution was obtained.

Comparative Examples 30–34

Other amines were converted into salts with different phosphoric acid esters, analogously to Example 29. These results are summarised in Table 5:

TABLE 5

| Comparative example No. | Amount of amine used | Amount of acid used | Amount of solvent or solvent mixture |
|---|---|---|---|
| Comparative example 30 | 12 parts 3-dimethyl-aminopropanol-1 | 38 parts phosphoric acid ester D | 16.7 parts PMA + 33.3 parts BG |
| Comparative example 31 | 9 parts 3-dimethyl-aminopropanol-1 | 41 parts phosphoric acid ester B | 16.7 parts PMA + 33.3 parts BG |
| Comparative example 32 | 10 parts dimethylamino-propylamine | 62 parts DDBSS | 24 parts PMA + 48 parts BG |
| Comparative example 33 | 10 parts dimethylamino-propylamine | 64 parts phosphoric acid ester D | 24.7 parts PMA + 49.3 parts BG |
| Comparative example 34 | 10 parts dimethylamino-propylamine | 91.7 parts phosphoric acid ester B | 33.9 parts PMA + 67.8 parts BG |

2. APPLICATION TECHNOLOGY EXAMPLES

The following abbreviations are used in the application technology examples:

| PMA | propylene glycol monomethyl ether acetate |
| DOP | dioctyl phthalate |
| PM | propylene glycol monomethyl ether |
| 2C system | two-component system |

Pigment pastes were produced using various products formed by salt formation from polyamines in order to examine the efficacy of the dispersing agents according to the invention. Pigment pastes were also produced, analogously thereto, using the products from Examples 29–34 which are not according to the invention.

For the production of the pigment pastes, 30 g of the carbon black pigment Spezialschwarz 4 (a product of Degussa), 46.8 g PMA and 23.2 g of each of the products listed below from the examples and comparative examples were admixed with 150 g glass beads (1 mm diameter) and were dispersed by means of a polypropylene disc of diameter 40 mm, at a peripheral speed of 20 m/sec at 40° C. for 1 hour.

Free-flowing pastes with excellent Theological properties could only be obtained with the dispersions which were prepared with the products according to the invention. Pastes could only be prepared using the products according to comparative examples 29–34 if additional solvent (PMA) was added to the milled pigment paste. However, even this reduction of the pigment content of the milled pigment paste resulted in pastes, the viscosities of which were sometimes higher than those of the pastes prepared using the additives according to the invention. The precise data obtained from the viscosity measurements are compared in Table 6.

Similar results to those obtained for the dispersion of carbon black were obtained for dispersions of other organic and inorganic pigments. The stability on storage of the pastes which were prepared with the additives according to the invention was excellent.

TABLE 6

| Product from | Pigment content of the paste | Viscosity of the paste* |
| --- | --- | --- |
| Example 11 | 30.0% | 491 |
| Example 14 | 30.0% | 503 |
| Example 18 | 30.0% | 390 |
| Example 23 | 30.0% | 1101 |
| Example 24 | 30.0% | 490 |
| Comparative ex. 29 | 17.0% | 11400 |
| Comparative ex. 30 | 21.5% | 1080 |
| Comparative ex. 31 | 19.5% | 2264 |
| Comparative ex. 32 | 17.0% | 5182 |

*Viscosity measured by means of a Rheolab MC 1U at a shear rate of 10/sec.

The pastes prepared by the aforementioned method were diluted with the aldehyde resin Laropal® A81; a product of BASF, until a pigment/resin ratio of 1.5/1 was obtained. Four pastes containing the dispersing agents according to the invention and four pastes containing products from the comparative examples were used as examples for the pigmentation of various binder vehicle systems.

In order to document the outstandingly broad range of compatibility of the pastes produced using the additives according to the invention, 3 binder vehicles of very different polarity were used:

a. A Nonpolar Binder Vehicle: a Long Oil Alkyd

| Composition of the clear lacquer: | |
| --- | --- |
| Jägerlyd ® FS 68; a product of Jäger | 68.5 parts |
| Kristallöl K 60 | 5.2 parts |
| Solvent naphtha K 30 | 23.8 parts |
| Drier AB; a product of Borchers | 1.7 parts |
| Ascinin ® R concentrate (skin formation preventer) | 0.8 parts | b. A Medium-Polarity Binder Vehicle: 2C System; Isocyanate-Crosslinked Polyacrylate

| Composition of the clear lacquer: | |
| --- | --- |
| Macrynal ® SM 510 N; a product of Hoechst (60% in xylene/BuAc (1/1) | 75.0 parts |
| dibutyltin dilaurate (1% in xylene) | 0.2 parts |
| Diethanolamine | 0.3 parts |
| PMA | 5.0 parts |
| Shellsol A | 5.0 parts |
| Xylene | 7.0 parts |
| Butyl acetate | 7.5 parts |
| Composition of the hardener solution: | |
| Desmodur ® N 75; a product of Bayer (75% in PMA/xylene (1/1)) | 50.0 parts |
| PMA | 5.0 parts |
| Shellsol A | 17.5 parts |
| Xylene | 10.0 parts |
| Butyl acetate | 17.5 parts |

The clear lacquer was mixed with the hardener solution in a ratio of 2:1.

c. A Polar Binder Vehicle: Alcohol-Soluble Nitrocellulose

| | |
| --- | --- |
| Nitrocellulose wool A400 (60% in xylene) | 15.0 parts |
| Alkydal ® F26; a product of Bayer | 25.0 parts |
| DOP | 2.0 parts |
| Ethanol | 20.0 parts |
| Toluene | 10.0 parts |
| i-Propanol | 5.0 parts |
| PM | 5.0 parts |
| Xylene | 15.0 parts |

The different binder vehicles were pigmented with the pastes described above in accordance with the amounts given in Table 7 below. The black pastes were placed in a vessel and the corresponding binder vehicle was stirred in. The pigmented lacquers were subsequently intensively mixed for 10 minutes in a Skandex paint shaker and were then applied to glass plates by means of a doctor blade. Gloss and haze measurements were made according to DIN 6753, using the Byk-Gardner haze-gloss measuring instrument, and are summarised in Table 8.

TABLE 7

| Parts | Long oil alkyd | 2C system | Nitrocellulose |
| --- | --- | --- | --- |
| binder vehicle | 92 | 61.3 | 70.4 |
| hardener | — | 30.7 | — |
| pigment paste | 8 | 8 | 8 |
| butyl acetate | — | — | 21.6 |

TABLE 8

| | Long oil alkyd/2C system/nitrocellulose | | | | | |
| --- | --- | --- | --- | --- | --- | --- |
| Product from | Gloss (20°) | Haze | Gloss (20°) | Haze | Gloss (20°) | Haze |
| Example 11 | 87 | 11 | 86 | 8 | 83 | 10 |
| Example 14 | 87 | 11 | 86 | 7 | 83 | 10 |
| Example 18 | 86 | 13 | 87 | 8 | 84 | 10 |
| Example 23 | 85 | 16 | 84 | 11 | 85 | 9 |
| Example 24 | 86 | 13 | 85 | 14 | 80 | 18 |
| Comp. Ex. 29 | 23 | 394 (P)* | n.m.* | n.m. | 69 | 78 (P) |
| Comp. Ex. 30 | 79 | 63 | n.m. | n.m. | 77 | 44 (P) |
| Comp. Ex. 31 | 79 | 68 (P) | n.m. | n.m. | 72 | 49 (P) |
| Comp. Ex. 32 | 22 | 393 | n.m. | n.m. | 62 | 65 (P) |

*(P) = visible particles
*n.m. = not measurable

As can be seen from Table 8, only the pigmented lacquers which were produced with the pastes according to the invention resulted in high-gloss coatings, which were free from particles and haze, in all the binder vehicle systems. A similar picture emerged for pigmented lacquers which were produced with other dispersing agents according to the invention and with other pigments.

The coatings which were produced with pastes which were not according to the invention exhibited considerably inferior values as determined by gloss and haze measurements. Moreover, for most lacquers the formation of coarse particles was observed, due to incompatibility with the binder vehicle and agglomeration of the pigment particles. In the 2C system in particular, the extent of flocculation of the carbon black particles could be such that gloss and haze measurements were no longer possible.

What is claimed is:

1. A dispersing agent for pigments or extenders comprising a salt of an amine-functional compound and an acid,
wherein the amine-functional compound contains at least three amino groups and is selected from the group consisting of an aliphatic, linear or branched polyamine, a modified polymine, a homo-, co- or block polymer having amine group substituents or a mixture thereof;
wherein the acid is a phosphoric acid ester of the formula $(HO)_{3-n}PO(OR^1)n$ where n=1 or 2, a sulphonic acid of the formula $HOSO_2R^2$, a sulphonic acid ester of the formula $HOSO_3R^2$ or a mixture thereof wherein $R^1$ and $R^2$ represent an alkyl, aryl or aralkyl radical containing at least 5 C atoms and/or a radical of an oxyalkylated alcohol with a number average molecular weight between 100 and 5000 g/mole and/or a radical containing at least one carboxylic acid ester group and/or a urethane group with a number average molecular weight between 100 and 5000 g/mole, and $R^1$ and $R^2$ can be the same or different;
wherein the aliphatic linear or branched polyamine is selected from the group consisting of diethylenetriamine, triethylenetetramine, tetraethylenepentamine, penethylenehexamine, hexaethyleneheptamine, a linear condensate of the formula $NH_2\text{-}(C_2H_4NH)_n\text{-}C_2H_4\text{-}NH_2$ where n is greater than 5 up to an integer providing a number average molecular weight of 1 million, a branched ($C_2$–$C_4$) alkylene amine containing tertiary amine groups with a number average molecular weight up to 1 million, a branched poly($C_2$–$C_4$)alkylene imine containing tertiary amine groups with a number average molecular weight up to 1 million, and any mixture thereof;
wherein, the modified polyamine is selected from the group consisting of a reaction product of an aliphatic linear or branched polyamine with a mono- or polyisocyanate, an epoxy compound, or a cyclic carbonate; a Michael reaction product of an aliphatic linear or branched polyamine with an α,β-unsaturated carbonyl compound or an α,β-unsaturated carboxylic ester or an α,β-unsaturated nitrile; and an alkylated or quaternized, aliphatic, linear or branched polyamine or combination thereof, with the proviso that the modified polyamine contains at least three amino groups which are convertable into salt groups;
and wherein the homo-, co- or block polymer is selected from the group consisting of a homo-, co- or block polymer of an aminoalkyl (meth)acrylate, and a homo-, co- or block polymer of an amine or nitrogen heterocycle substituted vinyl compound, the homo-, co- or block polymer having a number average molecular weight up to 1 million.

2. A dispersing agent according to claim 1, wherein the amine-functional compound is the linear condensate and the protons on the nitrogen are replaced by alkyl, aryl and/or aralkyl groups and/or are alkoxylated and/or quaternized.

3. A dispersing agent according to claim 1, wherein the amine-functional compound is a branched poly($C_2$–$C_4$) alkylene imine having a number average molecular weight of 600–200,000 g/mole.

4. A dispersing agent according to claim 1, wherein the amine-functional compound is a branched poly($C_2$–$C_4$) alkylene amine.

5. A dispersing agent according to claim 1, wherein the amine-functional compound is a modified polyamine in which 0.5 to 90 mole % of the primary and secondary amino groups of the aliphatic, linear or branched polyamine are converted to reaction product, Michael reaction product or alkylated or quaternized.

6. A dispersing agent according to claim 1, wherein one or more hydrogens in the aliphatic groups of $R^1$ and $R^2$ radicals are replaced by halogen atoms.

7. A dispersing agent according to claim 1, wherein $R^1$ and $R^2$ represent the radical of an oxyalkylated, monoalcohol.

8. A dispersing agent according to claim 1, wherein $R^1$ and $R^2$ represent the radical of an oxyalkylated monoalcohol containing carboxylic and ester- and/or urethane groups.

9. A dispersing agent according to claim 1, wherein $R^1$ and/or $R^2$ constitute a number average molecular weight of 200 to 5000 g/mole.

10. A dispersing agent according to claim 1, wherein the acid further comprises substituents with functional groups which exhibit inert behavior during salt formation.

11. A dispersing agent according to claim 1, wherein the degree of salt formation is defined as the ratio of acid equivalents to amine equivalents and falls with the range from 0.02 to 1.

12. A pigment composition comprising a dispersing agent according to claim 1 and a pigment and/or extender.

13. A dispersible solid comprising powder or fibrous particles coated with a dispersing agent according to claim 1.

14. A dispersible solid according to claim 13, which is a paste.

15. A pigmented lacquer comprising a mixture of a dispersing agent according to claim 1 a lacquer binder vehicle, and a pigment.

16. A pigmented coating on a substrate, comprising a pigmented lacquer according to claim 15 applied to the substrate, and stoved, hardened or crosslinked.

17. A method of producing a dispersing agent according to claim 1, wherein the amine-functional compound and the acid are reacted with each other to form the salt.

18. A dispersing agent according to claim 3 wherein the proteins on the nitrogens of the polyalkylene imine are replaced by alkyl, aryl and/or aralkyl groups or are alkoxylated or quaternized.

19. A dispersing agent according to claim 4 wherein the polyalkylene amine is an aziridine polymer.

20. A dispersing agent according to claim 1 wherein the amine-functional compound is a homo-, co- or block polymer having a number average molecular weight of 600 to 200,000 g/mole.

21. A dispersing agent according to claim 5 wherein the mole % is from 1 to 50 mole %.

22. A dispersing agent according to claim 7 wherein the oxyalkylated monoalcohol is a $C_2$–$C_4$ oxyalkylated monoalcohol.

23. A dispersing agent according to claim 8 wherein the oxyalkylated monoalcohol is a $C_2$–$C_4$ oxyalkylated monoalcohol.

24. A dispersing agent according to claim 9 wherein R1 and/or R2 constitute a number average molecular weight of 300 to 2500 g/mole.

25. A dispersing agent according to claim 11 wherein the degree of salt formation is from 0.1 to 1.

26. A dispersing agent according to claim 11 wherein the degree of salt formation is from 0.5 to 1.

27. A pigment composition according to claim 12 which is a lacquer, paste or molding composition.

28. A dispersible solid according to claim 13 wherein the powder or fibrous particles are pigment or filler particles.

29. A pigmented lacquer according to claim 15 further comprising an ingredient selected from the group consisting of a solvent, an extender, a lacquer adjuvant substance and any mixture thereof.

* * * * *